Apr. 10, 1923.

O. V. BERKLEY

VEHICLE HEADLIGHT

Filed Nov. 1, 1921

1,451,318

Inventor
O. V. Berkley

By D. Swift

Attorney

Patented Apr. 10, 1923.

1,451,318

UNITED STATES PATENT OFFICE.

OSCAR V. BERKLEY, OF BARBOURVILLE, KENTUCKY.

VEHICLE HEADLIGHT.

Application filed November 1, 1921. Serial No. 512,058.

*To all whom it may concern:*

Be it known that I, OSCAR V. BERKLEY, a citizen of the United States, residing at Barbourville, in the county of Knox, State of Kentucky, have invented a new and useful Vehicle Headlight; and I do hereby declare the following to be a full, clear, and exact description of the invention, such as will enable others skilled in the art to which it appertains to make and use the same.

The invention relates to vehicle headlights and has for its object to provide a headlight of this character for automobiles, said headlights being pivotally mounted and rockable in a longitudinal vertical plane through the medium of foot actuated mechanism, thereby allowing the light to be projected upon the road bed when going up or down an incline, and also allowing the vehicle lights to be so controlled as not to blind operators of approaching vehicles.

A further object is to provide controllable headlights for automobiles, said headlights being carried by transversely disposed rockable shafts, springs for normally holding said headlights in upper position and to provide a connecting rod controllable by a foot lever for controlling the upward and downward movement of the lights. Also to provide detent means for holding a foot lever in forward or operative position, said detent lever being positioned where it may be engaged and controlled by the foot of the operator.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
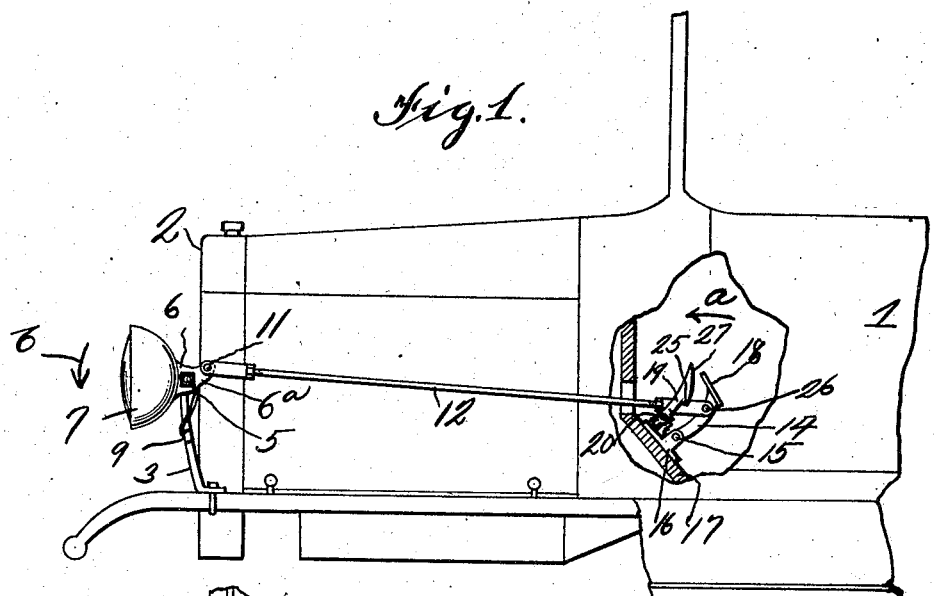
Figure 1 is side elevation of a portion of an automobile, showing the controllable lights applied thereto.
Figure 2:
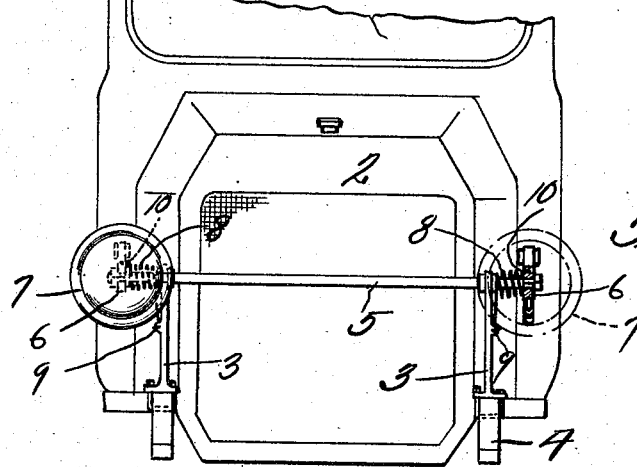
Figure 2 is a front elevation of a portion of an automobile, showing the headlights applied thereto.
Figure 3:
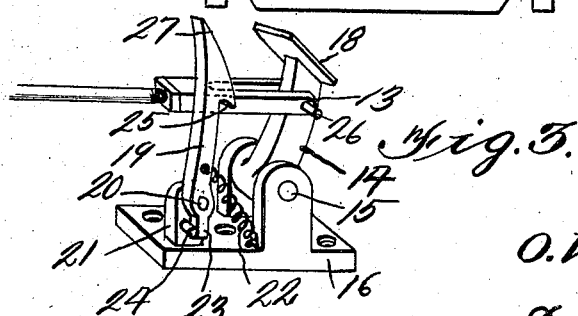
Figure 3 is an enlarged detail perspective view of the foot actuated lever, and the detent for holding said lever.

Referring to the drawings, the numeral 1 designates a portion of a conventional form of automobile and 2 the radiator thereof. Rockably mounted in bearings of brackets 3 carried by the frame 4 of the automobile is a rod 5, which rod is transversely disposed and preferably horizontally disposed. The outer ends of the rod 5 terminate beyond the brackets 3 and have secured thereon lamp arms 6, the forward ends of which carry lamps 7 which are normally horizontally disposed as shown in Figure 1, however upon going into a depression or up a hill, said lamps may be manually inclined downwardly. The lamps 7 are normally forced upwardly by means of coiled springs 8 which surround the ends of the rod 5 and have one of their ends anchored at 9 to the brackets 3, and their other ends anchored at 10 to the lamp arms 6. It will be seen that said springs will return the lamp 7 to normal horizontal positions under the influence of the springs after a lamp operation.

The rearwardly and upwardly extending arm 6ª of the lamp arms 6, at one side of the rod 5, has pivotally connected at 11 thereto a rearwardly extending rod 12, which rod is pivoted at 13 to a pivoted foot lever 14. The foot lever 14 is pivoted at 15 between ears carried by a plate 16, which plate is secured to the inclined portion 17 of the flooring of the body of the automobile. It will be seen that when the operator places his foot on the tread portion 18 of the foot lever 14 and forces the same in the direction of the arrow *a* that the lamps 7 will be rocked downwardly in the direction of the arrow *b*, thereby causing the light rays to be projected onto the road bed in front of the vehicle. However as the lamps 7 are moved upwardly under the influence of the springs 8, and the rockable rod 5 rocked by said springs, it will be seen that the operator may by varying the pressure on the foot lever 14 positively control the lamps 7.

It has been found that when a vehicle is going along a level road that it is often desirable to hold the foot lever 14 in forward position and consequently hold the lamps in down position for projecting the light on the road bed immediately forward of the vehicle. To accomplish this result a detent 19 is provided, which detent is pivoted at 20 to the lug 21 of the plate 16, and is normally held rearwardly by means of a coiled spring 22 and held in limited rearward movement by means of lugs 23 which engage the lugs 24 carried by the ear 21. The upper end of the detent 19 is provided with a lug 25, which lug when the foot lever 14 is forced forwardly engages over a pin 26 carried by the foot lever and holds the foot lever in forward position, thereby holding the lamps in depressed positions and allowing the operator to remove his foot from the foot lever. When the operator desires to release the foot lever 14, he simply places his foot in engagement with the upper end 27 of the detent 19 and forces the same forwardly, which action will release the foot lever 14 and allow the same to be forced rearwardly to normal position under the influence of the coiled springs 8.

From the above it will be seen that pivoted headlights are provided for an automobile, which headlights will be easily and quickly controlled by a foot lever within easy reach of the operator, thereby allowing the operator to depress the vehicle lights with his foot and consequently utilize both of his hands for steering purposes.

The invention having been set forth what is claimed as new and useful is:—

An automobile headlight mechanism comprising a transversely disposed rockable rod having headlights thereon, a rearwardly and upwardly extending arm carried by said rod, a foot lever pivotally mounted within the automobile, a connecting rod connecting said foot lever to the rear end of the rearwardly and upwardly extending arm, an outwardly extending lug carried by said foot lever, an upwardly extending pivoted arm adjacent one side of the foot lever, a shoulder carried by said pivoted arm and adapted to engage over the outwardly extending lug carried by the foot lever when said lever is forced forwardly, spring means for normally forcing the pivoted arm rearwardly, a stop lug disposed below the pivotal point of the pivoted arm, and a lug carried by the pivoted arm and adapted to engage the stop lug and limit the rearward movement of the pivoted arm.

In testimony whereof I have signed my name to this specification in the presence of two subscribing witnesses.

OSCAR V. BERKLEY.

Witnesses:
F. A. BATNFR,
CORA E. GEYER.